US007633258B2

(12) United States Patent
Huber et al.

(10) Patent No.: US 7,633,258 B2

(45) Date of Patent: Dec. 15, 2009

(54) ARRANGEMENT WITH A MOVABLE PORTION OF AN ARTICLE OF FURNITURE

(75) Inventors: Edgar Huber, Hard (AT); Klaus Mattle, Koblach (AT)

(73) Assignee: Julius Blum Gesellschaft M.B.H., Hoechst (AT)

( * ) Notice: Subject to any disclaimer, the term of this patent is extended or adjusted under 35 U.S.C. 154(b) by 97 days.

(21) Appl. No.: 10/325,886

(22) Filed: Dec. 23, 2002

(65) Prior Publication Data

US 2003/0122519 A1 Jul. 3, 2003

(30) Foreign Application Priority Data

Dec. 27, 2001 (AT) ............................ A 2037/2001

(51) Int. Cl.
*G05D 15/00* (2006.01)

(52) U.S. Cl. ...................................................... 318/646

(58) Field of Classification Search ......... 318/560–700, 318/283–286

See application file for complete search history.

(56) References Cited

U.S. PATENT DOCUMENTS

| | | | | |
|---|---|---|---|---|
| 5,716,114 | A | 2/1998 | Holmes et al. | |
| 5,774,046 | A * | 6/1998 | Ishihara et al. | 340/438 |
| 5,804,937 | A | 9/1998 | Sasajima et al. | |
| 5,822,707 | A * | 10/1998 | Breed et al. | 701/49 |
| 6,291,957 | B1 * | 9/2001 | Hopson et al. | 318/466 |
| 6,952,087 | B2 * | 10/2005 | Lamm | 318/283 |

FOREIGN PATENT DOCUMENTS

| | | | | |
|---|---|---|---|---|
| AT | 398513 | B | | 12/1994 |
| DE | 1017351 | | | 10/1957 |
| DE | 4402899 | C1 | | 8/1995 |
| DE | 19639974 | A1 | | 6/1997 |
| EP | 0957225 | A1 | | 11/1999 |
| GB | 2 343 371 | | | 5/2000 |
| JP | 01-185996 | | * | 7/1989 |
| JP | 55-166763 | | * | 12/1990 |
| JP | 03-250181 | | * | 7/1991 |
| JP | 03-250181 | | | 11/1991 |
| JP | 06-014819 | | | 1/1994 |
| JP | 06-267168 | | | 9/1994 |
| JP | 09-075150 | | | 3/1997 |
| JP | 11-009355 | | | 1/1999 |
| JP | 11-089642 | | | 4/1999 |
| JP | 2000-511802 | | | 9/2000 |
| JP | 2001-199692 | | | 7/2001 |

* cited by examiner

*Primary Examiner*—Walter Benson
*Assistant Examiner*—Erick Glass
(74) *Attorney, Agent, or Firm*—Wenderoth, Lind & Ponack, L.L.P.

(57) ABSTRACT

An arrangement with a movable portion of an article of furniture, in particular a drawer (3) or the like, includes a drive unit (5) and a regulating device (1) for regulating the drive unit (5). The arrangement has a preferably analog force measuring device (2), and the force measuring device (2) produces a force signal which is characteristic for forces (20) applied from the exterior to the movable portion (3) of the article of furniture and which can be fed to the regulating device (1).

21 Claims, 5 Drawing Sheets

ARRANGEMENT WITH A MOVABLE PORTION OF AN ARTICLE OF FURNITURE

BACKGROUND OF THE INVENTION

The present invention concerns an arrangement including a movable portion of an article of furniture, in particular a drawer, or the like, with a drive unit and with a regulating device for regulating the drive unit.

Arrangements of that kind are, in principle, already known. German patent specification DE 1 017 351 describes a device for pulling out or pushing in drawers in articles of furniture, which can be pulled out and in by a drive unit actuated by means of push buttons on the body of the article of furniture. Any possible positioning of the drawer between the completely pushed-in and the completely pulled-out position is possible, by means of the triggering device which is in the form of push buttons. Austrian patent specification AT 398 513 B describes a drawer guide fitment, the drive of which is operated by a capacitive touch switch arranged at the front panel of the drawer. By touching the touch switch, the drawer moves in or out. European patent application EP 0 957 225 A1 discloses a device for opening a drawer provided with a drive unit, wherein the drive unit is operated by a triggering element in the form of a touch switch. The last two publications each disclose a triggering element which has two switching conditions. Consequently, after performing a pulling-out operation, and upon actuation of the triggering element, only triggering of the opposite procedure is then possible.

SUMMARY OF THE INVENTION

The object of the present invention is to provide an arrangement of the general kind set forth, which permits more intuitive operation of a movable portion of an article of furniture, which is driven by a drive unit.

In accordance with the invention, the arrangement has a preferably analog force measuring device, and the force measuring device produces a force signal which is characteristic for forces applied externally to the movable portion of the article of furniture. This force signal can then be fed to a regulating device.

In accordance with the invention there is provided an arrangement which can be actuated like a usual movable portion of an article of furniture, which is not additionally driven. In accordance with the invention, the force measuring device is operable to produce a force signal which transmits the actuation wish of the user to the regulating device. The regulating device calculates therefrom a regulating signal which permits support by the drive unit for the movement of the movable portion of the article of furniture, as is wanted by the user. In that way, the movement wanted by the user is supported, while at the same time the intuitively known procedure involved in opening or closing a movable portion of an article of furniture is still fully retained, from the point of view of the user.

It is particularly desirable in that respect if the force signal contains both the information about the amount and also about the direction and preferably about the directional component in parallel relationship with the pull-out direction of the movable portion of the article of furniture, of the forces which are applied from the exterior to the movable portion of the article of furniture. This variant thus provides that by means of the force measuring device the regulating device recognizes whether a pushing force or a pulling force is being applied to the movable portion of the article of furniture. In that way, the regulating device can decide whether the movable portion of the article of furniture is to be opened, closed, accelerated or decelerated. In addition, by virtue of measurement of the amount of the forces applied from the exterior to the movable portion of the article of furniture, it is also possible to determine how greatly the portion of the article of furniture is to be accelerated or decelerated in the opening or closing movement.

In addition, it is desirable that the arrangement has at least one position measuring device which produces a position signal which is characteristic of the condition of opening of the movable portion of the article of furniture and can be fed to the regulating device. The position signal made available in that way can serve for calculation of the instantaneous actual position and/or the instantaneous actual speed and/or the instantaneous actual value of the acceleration or deceleration of the movable portion of the article of furniture, as a function of the measured position. That is advantageously embodied by the regulating device having an actual value calculation device.

An advantageous variant further provides that the regulating device has a reference value calculation device which, from the force signal produced by the force measuring device, calculates a reference value for the acceleration or deceleration of the movable portion of the article of furniture, in which respect a particularly preferred embodiment in turn provides that the reference value in respect of acceleration or deceleration is independent of the condition of loading of the movable portion of the article of furniture. That embodiment provides that the movable portion of the article of furniture is always moved with the same acceleration or deceleration, independently of how full the portion is (i.e., the weight of the portion), when a given external force is applied to the movable portion of the article of furniture. That gives the user the feeling that the movable portion of the article of furniture apparently always has the same mass irrespective of how full it is, and means that opening or closing a completely filled movable portion of an article of furniture feels the same to the user and involves the same application of force as opening or closing an empty movable portion of the article of furniture.

This advantage can desirably be implemented by a regulating device having a regulating module which adapts the actual value of acceleration or deceleration to the reference value of the acceleration or deceleration by transmitting a regulating signal to a drive unit regulator, in which the drive unit regulator actuates the drive unit. This actual value/reference value comparison of acceleration provides that the drive unit deliberately and specifically supports the movement of the movable portion of the article of furniture in such a way that even a filled movable portion of the article of furniture, from the point of view of the user, can apparently be actuated like an empty movable portion of the article of furniture.

In order to ensure that the movable portion of the article of furniture is braked in good time before reaching its end position upon being opened or closed, it is advantageous for the regulating device to have a speed reference value calculation device which calculates a reference value for speed, which is dependent on the actual position. The regulating module sends the drive unit regulator a control command for reducing the actual value of acceleration or for increasing the actual value of deceleration when the actual value of speed exceeds the reference value of speed for the instantaneous position. In this embodiment, therefore, the control signals which are exerted by the user of the movable portion of the article of furniture by pushing or pulling thereon are controlled in such a way that the movable portion of the article of furniture comes to rest in the completely extended or in the completely pushed-in position. That prevents accidental damage to the entire device.

In a further advantageous embodiment of invention, the regulating device has a speed reference value calculation device which calculates a reference value of speed, which is dependent on the actual position. The regulating module sends the drive unit regulator a control command for reducing the actual value of acceleration or for increasing the actual value of deceleration when the actual value of speed exceeds the reference value in respect of speed for the instantaneous position. It can also be provided that the force measuring device is arranged between the front panel and a part, which directly adjoins the same, of the movable portion of the article of furniture. It is particularly advantageous if the force measuring device is arranged between a front panel and the drive unit.

BRIEF DESCRIPTION OF THE DRAWINGS

Further details and features of the present invention will be apparent from the specific description hereinafter. In the drawings.

DETAILED DESCRIPTION OF THE INVENTION

Figure 1:
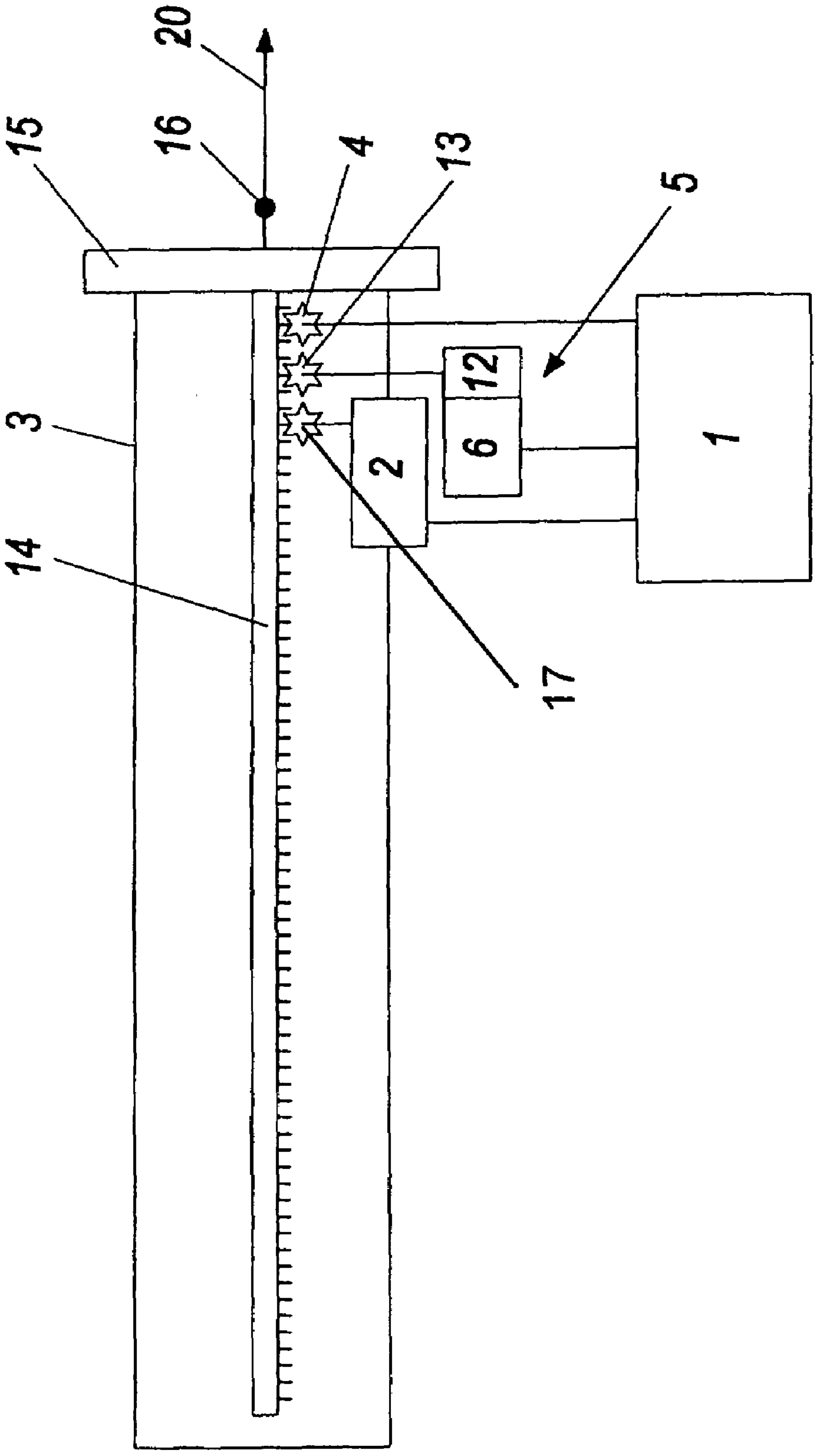
FIG. 1 is a diagrammatic side view of an embodiment according to the invention with a drawer.

FIG. 1 shows a movable portion of an article of furniture in the form of a drawer or drawer member 3 without any surrounding parts of the article of furniture in which it is installed. In this case, as is generally usual, the drawer 3 has a front panel 15 and a handle 16. In addition, arranged on the drawer 3 shown in a side view is a guide rail 14 which at its lower edge is in the form of a toothed rack. In this case, as is known in the art, the drawer is guided upon being opened or closed by way of the rail 14. This is not shown in greater detail here and can be implemented in the most widely varying ways.

To assist with the opening and closing movement, the arrangement has a drive unit 5 arranged in such a fashion that a gear 13 driven by the drive unit 5 engages the rack mounted on the guide rail 14. In this case, the drive unit 5 has an electric motor, preferably a servomotor 6, and a transmission 12. The drawer 3 can be both partially or completely opened and also partially or completely closed, by means of the drive unit 5 designed in that way. In this case, the drive unit 5 is mounted in a stationary manner to the article of furniture (not shown) which surrounds the drawer. A position measuring device 4 (shown here in the form of a gear engaging the rack) is provided for determining a position signal which indicates the open or closed condition of the drawer.

Figure 5:
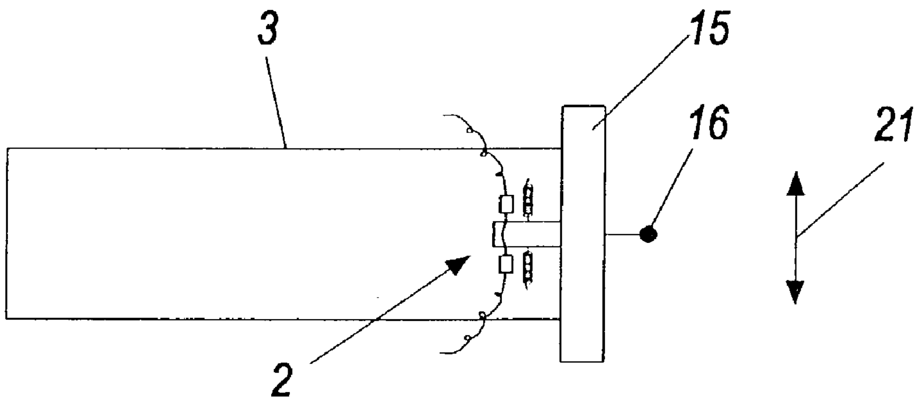
FIGS. 5 and 6 shows specific alternative embodiments of the force measuring device.
Figure 6:
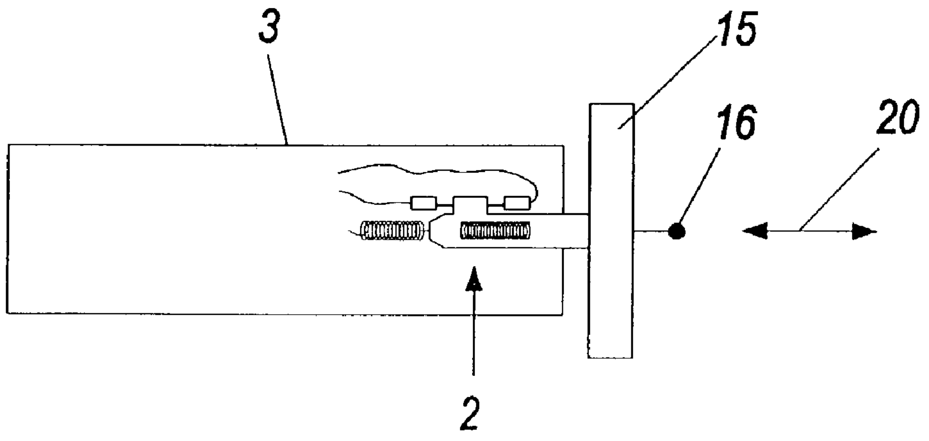
Figure 7:
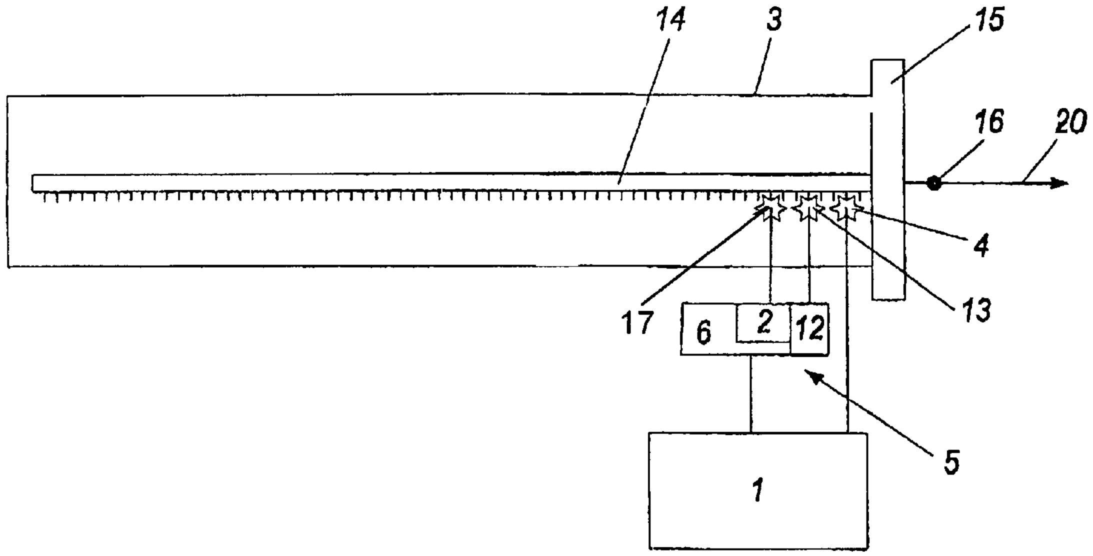
FIG. 7 is a diagrammatic side view similar to FIG. 1, in which a force measuring device is arranged in a motor.

In accordance with the invention, the arrangement has a force measuring device 2 for determining the amount of and the direction of the forces 20 which act from the exterior on the drawer 3. The force measuring device 2 can engage by way of a gear 17 the rack in the rail 14. However, numerous other arrangements and configurations of the force measuring device according to the invention are also possible, as an alternative thereto. Thus, the force measuring device 2 may also be arranged, for example, on the handle 16 or between the front panel 15 and the drawer 3. In general, the force measuring device 2 is arranged between a front panel 15 and a part, directly adjoining the same, of the movable portion 3 of the article of furniture, or the force measuring device 2 is arranged between a front panel 15 and the drive unit 5, preferably in the motor 6 as illustrated in FIG. 7. In this respect, FIG. 5 shows a variant of the force measuring device 2 which is adapted for actuation of the handle 16 in a vertical direction 21. FIG. 6 shows a variant which detects forces in a horizontal direction 20. The most widely varying force or acceleration measuring devices can be considered as the force measuring device 2. These can be, for example, wire strain gauges, piezoelectric force pick-up devices or electromagnetic force measuring devices such as moving coil instruments.

The force measuring device 2 and the position measuring device 4, by way of suitable lines, supply a regulating device 1 with a force signal and a position signal, respectively, from which an actuating signal for the drive unit 5 is calculated in the regulating device 1. As noted above, the force measuring device 2 detects the amount and direction of the force, and the force signal corresponds to the detected amount and direction of the force. When measuring the forces 20 which act from the exterior on the drawer, only the horizontal force component in the direction of movement of the drawer 3 (identified by the direction arrow 20) is generally measured, as in the usual embodiment shown in FIG. 1, as the vertically acting force components are transmitted by the guide rail to corresponding mountings which are designed in accordance with the state of the art. The transmission of force from the drive unit 5 and the arrangement of the position measuring device 4 and the force measuring device 2 can also be implemented in a manner other than that shown. For that purpose, for example, it is possible to use drives by way of cable lines, toothed belts or guide rails which are driven in some other fashion.

Figure 2:
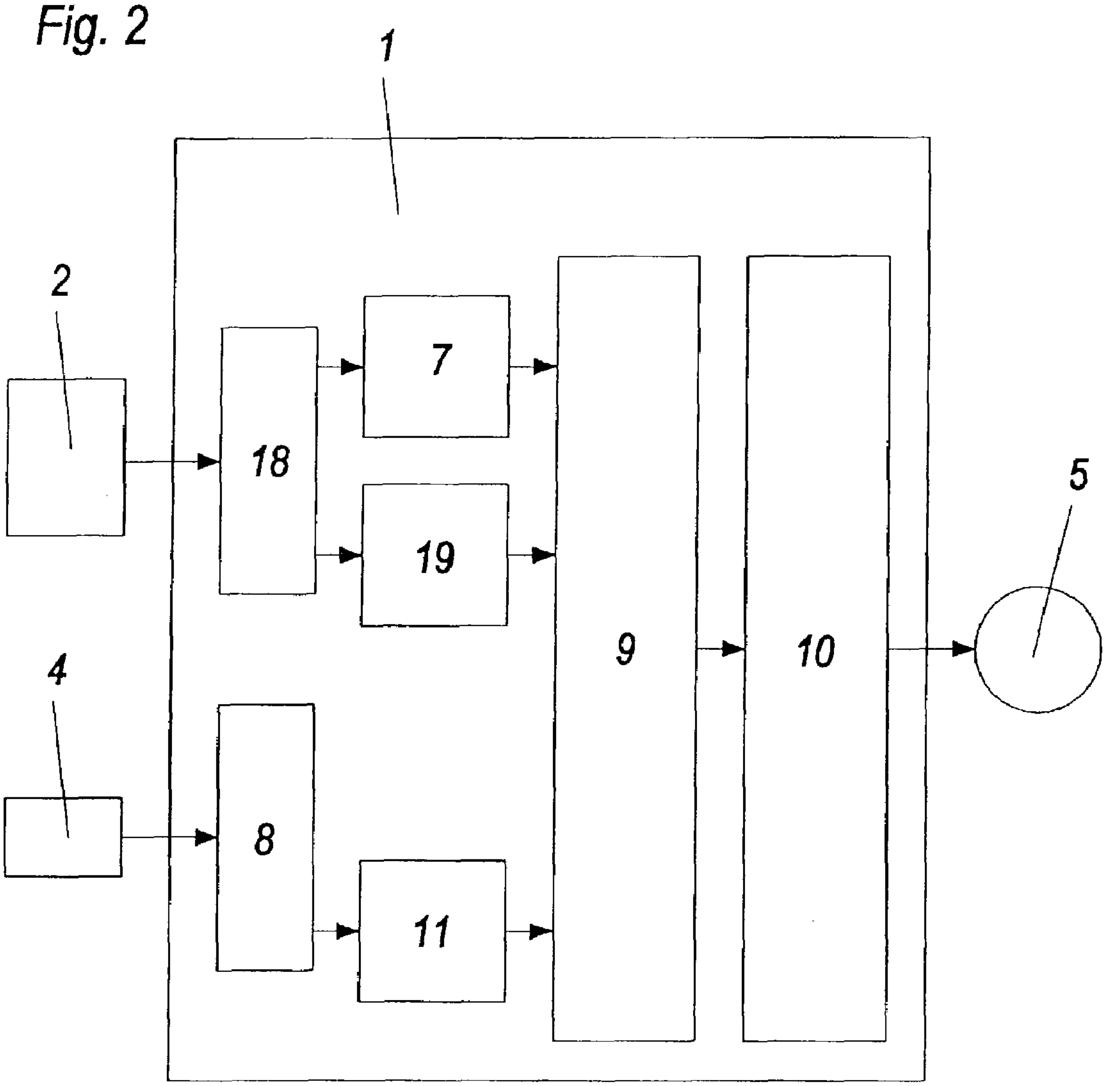
FIG. 2 is a diagrammatic view showing a possible design configuration of the regulating device.

The regulating device 1 shown in FIG. 2 firstly receives a force signal from the force measuring device 2 and a position signal from the position measuring device 4. The regulating device 1, the force measuring device 2 and the position measuring device 4 can be both of an analog and also a digital nature and also in part analog and in part digital. In the illustrated embodiment, the analog force measuring device 2 passes an analog measuring signal to the analog input 18. The latter transmits the measuring signal to the reference value calculation device 7 and to the comparator 19. The position signal produced by the position measuring device 4 (for example an encoder in the form of a sine-cosine sender or incremental sender) is fed to the actual value calculating device 8. Calculated therein from the position signal are both the instantaneous actual position $x_1$ and actual speed, and also the instantaneous actual value of acceleration or deceleration of the drawer. The actual value of speed and acceleration can be calculated in that respect, for example, by single or double derivation of the actual value of the position in respect of time. All three actual values calculated in that way are fed to the regulating module 9 and the speed reference value calculating device 11. The latter calculates therefrom for each position the reference value for speed, which is not to be exceeded at any position by the actual value of speed (see in that respect FIG. 4).

The comparator 19 receives both information about the instantaneous actual speed and also the force signal which contains the information about the forces being externally applied at the time to the drawer. In that case, the comparator 19 calculates a signal which tells the regulating module 9 whether pressure or traction is being applied to the movable portion of the article of furniture or the drawer. The reference value calculation device 7 calculates from the force signal the reference value of acceleration of the drawer. In that case, account is generally taken of both the frictional forces which act on the drawer or the movable portion of the article of furniture upon being opened or closed and also the holding forces which only act on the drawer or the movable portion of the article of furniture in the end positions. The aim of the calculation is to afford a reference value of acceleration or deceleration, which matches the acceleration or deceleration of an empty drawer or an empty movable portion of the article of furniture, with the measured externally applied forces. That can be implemented both by calculation and also by means of a digital table in which measured acceleration or deceleration values of the empty portion of the article of furniture are stored corresponding to the measured forces applied thereto from the exterior. In the case of a non-filled portion of an article of furniture, the reference value of acceleration preferably corresponds to the acceleration value which would be afforded without additional support from the drive unit, by the externally applied forces. In the case of a filled portion of an article of furniture, the reference value of acceleration is calculated in such a way that the forces which additionally have to be applied due to the filling, for opening or closing the portion of the article of furniture, are compensated for by the drive unit.

The values which are calculated as explained above are fed to the regulating module 9. In the regulating module 9, a control command is produced, which adapts the actual value of acceleration or deceleration to the reference value of acceleration or deceleration. In that case, the arrangement further monitors that the actual value of speed does not at any position of the movable portion 3 of the article of furniture exceed the reference value of speed. As an alternative to actual value/reference value comparison of acceleration, the measured force externally applied to the movable portion 3 of the article of furniture can be compensated for by suitable acceleration or deceleration to 0 in the regulating module 9. The control command calculated in that way is fed to the drive unit regulator 10. The latter can be, for example, in the form of a servomotor regulating module, preferably with a cascaded positional regulator, a speed regulator, and a current regulator, and actuates the motor or servomotor 6 of the drive unit 5. The actuating signal necessary for that purpose can be, for example, a pulse width-modulated current, as is known in the state of the art for servoregulators. In that respect, the regulating device 1 shown in FIG. 2 is only one possible alternative configuration of a regulating procedure for the arrangement according to the invention. The components diagrammatically illustrated in FIG. 2 can be both in the form of an integrated device and also in the form of an arrangement of various separate components.

The device according to the invention as diagrammatically shown in FIGS. 1 and 2 serves both for supporting the closing movement of the movable portion of the article of furniture and also the opening movement thereof. In the closing procedure, the acceleration phases and deceleration phases take place in a corresponding fashion as in the opening procedure. The deceleration phase, however, can be effected in such a way that the servoassistance effect is deactivated as from a user-defined position and the movable portion of the article of furniture moves into the end position with kinematic parameters which are always the same (positive guidance).

Figure 3:
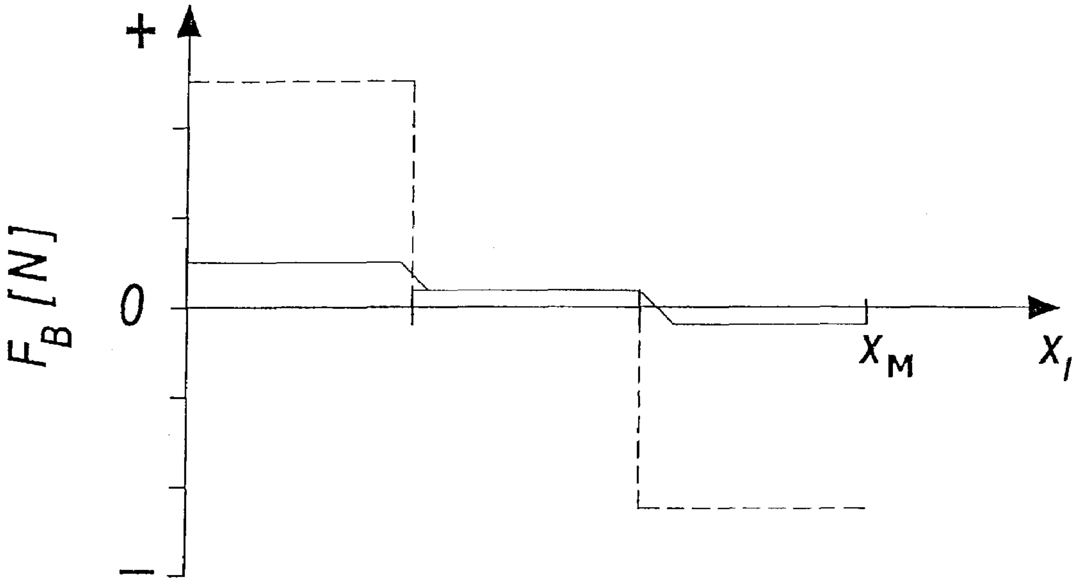
FIG. 3 shows a comparison of the force required when actuating a purely manually operated drawer in the empty and in the filled condition.

FIG. 3, showing an arbitrary calculation example, shows the forces of a typical opening procedure for an empty drawer (solid line) and a filled drawer (broken line). In order to achieve a level of acceleration and a level of deceleration of 1 $m/s^2$ in each case for the drawer, in the case of the empty drawer 3 an external actuating force 20 of 8 N is required for acceleration and an actuating force of 2 N is required for deceleration (solid line). With a filled drawer, to achieve the same acceleration and deceleration values without servoassistance, an external actuating force of 53 N is necessary for acceleration and 47 N for deceleration (broken line). The calculation example shown in FIG. 3 is based on a uniform frictional force of 3 N, a non-existent force in the guide system for holding the drawer shut of 0 N, a desired acceleration/deceleration for the drawer of 1 $m/s^2$ and an inherent mass of the drawer of 5 kg. The mass of the material filling the drawer is 45 kg.

Due to the arrangement according to the invention as illustrated in FIGS. 1 and 2, however, the drawer behaves like an empty-drawer system (solid line) as the externally acting actuating force 20 is converted directly into a reference value of acceleration for the drive unit. That provides that at an 8 N actuating force 20 applied to the filled drawer 3, due to the support, the filled drawer 3 also already experiences an acceleration or deceleration respectively of 1 $m/s^2$. Without that supporting assistance by the drive unit 5, the filled drawer (with the values adopted in the above-specified calculation examoke) would only experience an acceleration of 0.1 $m/s^2$ if it were accelerated or decelerated with an actuating force of 8N. In the example shown in FIG. 3, the externally applied actuating force $F_B$ is plotted to correspond to the actual position $x_1$ of the drawer.

Figure 4:
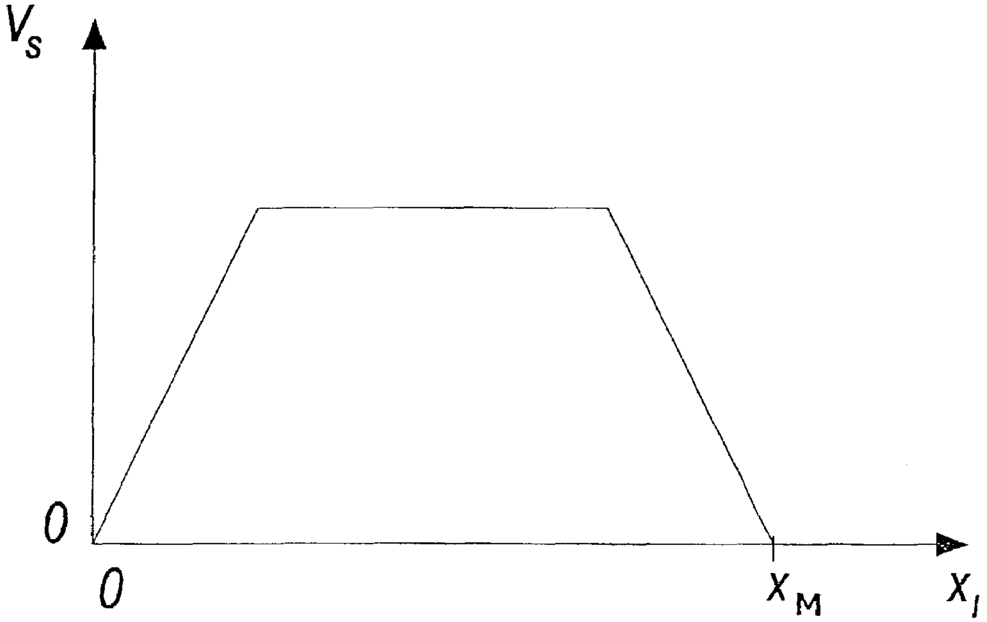
FIG. 4 shows a representation by way of example relating to the reference value of the speed as a function of the instantaneous position.

FIG. 4 shows an example for a curve of the reference value $V_s$ of speed, calculated for a given condition of movement of the movable portion of the article of furniture. The reference value curve calculated in that way allows the regulating device 1 to ensure that the movable portion of the article of furniture comes to a stop in the end positions (0 or $x_M$) and thus no incorrect operation is possible. When opening or closing the drawer, the ramp shown in FIG. 4 is calculated in such a way that the maximum achievable speed decreases linearly to zero from a given position. As an alternative to calculation of the reference value of speed, the corresponding reference value curves are preferably digitally stored.

It is additionally possible to provide a switching threshold in the regulating procedure, in which, if the actuating force 20 in the direction 20 or 21 is less than the switching threshold, the movable portion of the article of furniture is decelerated with a user-defined deceleration value. That threshold value can be calculated, for example, from the frictional force of the empty movable portion of the article of furniture, and it can also be ascertained by way of other aspects. Overall, the regulating device 1 provides that the highest speed of the movable portion of the article of furniture is at any position always less than or equal to the reference value $V_s$ of speed.

The invention claimed is:

1. An apparatus for positioning a furniture portion, comprising:

a movable portion of a furniture component;

a drive unit for driving said movable portion;

a regulating device for controlling said drive unit; and a force measuring device for detecting a force applied externally to said movable portion, for generating a force signal corresponding to the detected force, and for transmitting the force signal to said regulating device, said regulating device being operable to start said drive unit based on the force signal generated by and received from said force measuring device such that said drive unit moves said movable portion based on the force signal generated by said force measuring device.

2. The apparatus of claim 1, wherein said movable portion comprises a drawer.

3. The apparatus of claim 1, wherein said force measuring device comprises an analog force measuring device.

4. The apparatus of claim 1, further comprising a position measuring device for detecting a position of said movable portion, for generating a position signal corresponding to the detected position, and for transmitting the position signal to said regulating device.

5. The apparatus of claim 4, wherein said regulating device includes an actual value calculation device operable to calculate at least one of an instantaneous actual position, an instantaneous actual speed, and an instantaneous actual acceleration or deceleration of said movable portion, based on the position signal.

6. The apparatus of claim 5, wherein said regulating device further includes:

a drive unit regulator for actuating said drive unit; and a regulating module for adapting the instantaneous actual acceleration or deceleration to a reference acceleration or deceleration value by transmitting a regulating signal to said drive unit regulator.

7. The apparatus of claim 1, wherein said drive unit includes an electric motor.

8. The apparatus of claim 7, wherein said electric motor comprises a servomotor.

9. The apparatus of claim 1, wherein said force measuring device is arranged between a front panel of said movable portion and a part of said movable portion directly adjoining said front panel.

10. The apparatus of claim 1, wherein said force measuring device is arranged between a front panel of said movable portion and said drive unit.

11. The apparatus of claim 1, wherein said force measuring device is arranged in a motor of said drive unit.

12. The apparatus of claim 1, wherein said movable portion includes a guide rail having a toothed rack formed thereon, said force measuring device including a gear engaging said toothed rack.

13. The apparatus of claim 1, wherein said force measuring device is operable to detect the amount of force applied externally to said movable portion, and is operable to generate the force signal based on the detected amount of force.

14. The apparatus of claim 1, wherein said force measuring device is operable to detect force applied externally to said movable portion in a horizontal direction with respect to said movable portion.

15. An apparatus for positioning a furniture portion, comprising:

a movable portion of a furniture component;

a drive unit for driving said movable portion;

a regulating device for controlling said drive unit; and a force measuring device for detecting a force applied externally to said movable portion, for generating a force signal corresponding to the detected force, and for transmitting the force signal to said regulating device, wherein said force measuring device is operable to detect both the amount of force applied externally to said movable portion and the direction of the force applied, and is operable to generate the force signal based on the detected amount of force and the detected direction of the force.

16. The apparatus of claim 15, further comprising a position measuring device for detecting a position of said movable portion, for generating a position signal corresponding to the detected position, and for transmitting the position signal to said regulating device.

17. The apparatus of claim 15, wherein said regulating device is operable to start said drive unit based on the force signal generated by and received from said force measuring device.

18. An apparatus for positioning a furniture portion, comprising:

a movable portion of a furniture component a drive unit for driving said movable portion;

a regulating device for controlling said drive unit; and a force measuring device for detecting a force applied externally to said movable portion, for generating a force signal corresponding to the detected force, and for transmitting the force signal to said regulating device, said regulating device being operable to control said drive unit based on the force signal received from said force measuring device such that said drive unit moves said movable portion based on the force signal generated by said force measuring device;

wherein said force measuring device is operable to detect both the amount of force applied externally to said movable portion and the directional component of the force applied parallel to a direction of movement of said movable portion, and is operable to generate the force signal based on the detected amount of force and the detected directional component of the force.

19. An apparatus for positioning a furniture portion, comprising:

a movable portion of a furniture component;

a drive unit for driving said movable portion;

a regulating device for controlling said drive unit said regulating device including:

a drive unit regulator for actuating said drive unit; and a regulating module for adapting an instantaneous actual acceleration or deceleration to a reference acceleration or deceleration value by transmitting a regulating signal to said drive unit regulator; and a force measuring device for detecting a force applied externally to said movable portion, for generating a force signal corresponding to the detected force, and for transmitting the force signal to said regulating device, said regulating device being operable to control said drive unit based on the force signal received from said force measuring device such that said drive unit moves said movable portion based on the force signal generated by said force measuring device;

a position measuring device for detecting a position of said movable portion, for generating a position signal corresponding to the detected position, and for transmitting the position signal to said regulating device;

wherein said regulating device includes an actual value calculation device operable to calculate at least one of an instantaneous actual position, an instantaneous actual speed, and the instantaneous actual acceleration or deceleration of said movable portion, based on the position signal;

wherein said regulating device further includes a speed reference value calculation device for calculating a reference speed value based on the instantaneous actual position, said regulating module being operable to transmit to said drive unit regulator a regulating signal for reducing the instantaneous actual acceleration or for increasing the instantaneous actual deceleration when the instantaneous actual speed exceeds the reference speed value for the instantaneous actual position.

20. An apparatus for positioning a furniture portion, comprising:

a movable portion of a furniture component;

a drive unit for driving said movable portion;

a regulating device for controlling said drive unit; and a force measuring device for detecting a force applied externally to said movable portion, for generating a force signal corresponding to the detected force, and for transmitting the force signal to said regulating device, said regulating device being operable to control said drive unit based on the force signal received from said force measuring device such that said drive unit moves said movable portion based on the force signal generated by said force measuring device;

wherein said regulating device includes an acceleration or deceleration reference value calculation device for calculating a reference acceleration or deceleration value of said movable portion based on the force signal.

21. The apparatus of claim 20, wherein said acceleration or deceleration reference value calculation device is operable to calculate the reference acceleration or deceleration value of said movable portion independent of the loading condition of said movable portion.

* * * * *